United States Patent [19]

French et al.

[11] Patent Number: 4,761,005
[45] Date of Patent: Aug. 2, 1988

[54] SPORTS SCORING DEVICE INCLUDING A FLEXIBLE PREZOELECTRIC LAYER RESILIENT LAYER

[75] Inventors: Barry J. French, 30612 Salem Dr., Bay Village, Ohio 44140; Clifford D. Fung, Cleveland Heights, Ohio

[73] Assignee: Barry J. French, Bay Village, Ohio

[21] Appl. No.: 785,969

[22] Filed: Oct. 10, 1985

[51] Int. Cl.⁴ ..................... A63B 67/00; A63B 69/00
[52] U.S. Cl. .................................. 273/1 GC; 273/1 E; 272/76; 272/77; 310/318; 310/800; 73/862.59
[58] Field of Search .......... 273/1 GE, 183 R, 183 A, 273/184 R, 186 A, 181 G, 181 J, 181 K, 1 GC, 1 ES, 1 F; 272/76, 77; 310/310, 318, 319, 800, 311; 73/862.59

[56]  References Cited
U.S. PATENT DOCUMENTS

| 2,916,287 | 12/1959 | Davey . |
| 3,239,696 | 3/1966 | Burkhalter et al. . |
| 3,302,214 | 2/1967 | Yuritch . |
| 3,323,367 | 6/1967 | Searle . |
| 3,580,575 | 5/1971 | Speeth . |
| 3,604,958 | 9/1971 | Palini . |
| 3,750,127 | 7/1973 | Ayers et al. . |
| 3,798,474 | 3/1974 | Cassand et al. . |
| 3,866,909 | 2/1975 | DeSantis . |
| 3,920,242 | 11/1975 | Reith et al. . |
| 3,935,485 | 1/1976 | Yoshida et al. . |
| 3,970,862 | 7/1976 | Edelman et al. . |
| 4,029,315 | 6/1977 | Bon ................................. 273/184 R |
| 4,030,731 | 6/1977 | Delcayne ........................... 273/1 F |
| 4,054,808 | 10/1977 | Tanaka . |
| 4,088,315 | 5/1978 | Schemmel . |
| 4,166,229 | 8/1979 | DeReggi et al. . |
| 4,216,403 | 8/1980 | Krempl et al. . |
| 4,254,951 | 3/1981 | DeLaney . |
| 4,304,126 | 12/1981 | Yelke . |
| 4,328,441 | 5/1982 | Kroeger, Jr. et al. . |
| 4,413,202 | 11/1983 | Krempl et al. . |
| 4,432,545 | 2/1984 | Vanderpool . |
| 4,440,400 | 4/1984 | Neuberger ........................ 273/1 ES |
| 4,443,730 | 4/1984 | Kitamura et al. . |
| 4,499,394 | 2/1985 | Koal . |
| 4,504,761 | 3/1985 | Triplett ............................. 310/800 |
| 4,546,658 | 10/1985 | Rocha et al. ..................... 73/862.59 |

FOREIGN PATENT DOCUMENTS

| 2741090 | 3/1979 | Fed. Rep. of Germany . |
| 267403 | 2/1970 | U.S.S.R. . |
| 598613 | 2/1978 | U.S.S.R. . |
| 657828 | 4/1979 | U.S.S.R. . |
| 673285 | 7/1979 | U.S.S.R. . |
| 709099 | 1/1980 | U.S.S.R. . |
| 880434 | 11/1981 | U.S.S.R. . |
| 963534 | 4/1983 | U.S.S.R. . |

OTHER PUBLICATIONS

"Stikometer", advertisement appearing in Black Belt Magazine, Apr. 1984.
"Solev PVDF Biaxially Oriented Piezo and Pyroelectric Films for Transducers", Made available at a meeting called Transducer '85, at Philadelphia, PA on Jun. 11 and 12, 1985.
Advertisement from Apr. 1984 issue of "Black Belt" magazine, showing a type of fixedly mounted kicking target whose function is said to be measuring the peak force of your blow.

Primary Examiner—William H. Grieb
Assistant Examiner—MaryAnn Stoll Lastova
Attorney, Agent, or Firm—D. Peter Hochberg; Mark M. Kusner; Walter C. Danison, Jr.

[57]  ABSTRACT

Disclosed is a device for generating an analog output signal indicative of an impact to a transducer. The transducer may be mounted on protective equipment utilized in various martial arts fields, such as protective vests and the like or can be mounted on training equipment, such as a heavy bag, striking pad, etc. In a preferred embodiment the transducer is a piezoelectrical signal which is indicative of the amount of deformation. By placing the piezoelectric film on top of a deformable material, in a preferred embodiment sandwiching it in the deformable material, impacts to the deformable material will strain the piezoelectric film generating the signal output. In a further embodiment of the present invention, the piezoelectric transducer is mounted on a target pad and provides an analog output indicative of the characteristics of an object impacting the target pad. For use in the martial arts, the transducer may be connected to a transmitter and remote receiver for providing an indication of the impact at a remote location.

13 Claims, 5 Drawing Sheets

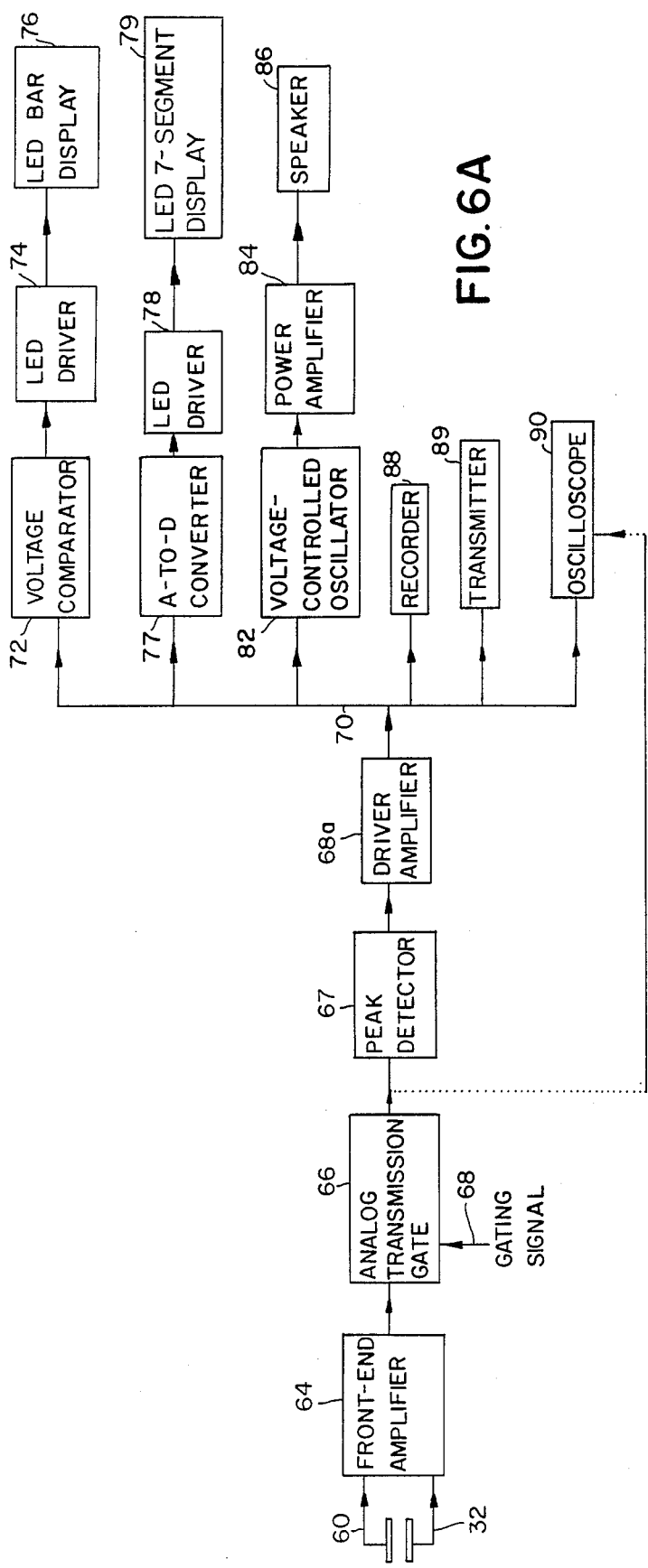
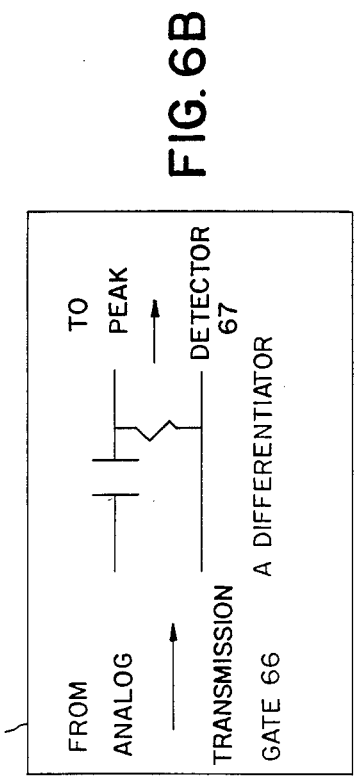
FIG.6A
FIG.6B

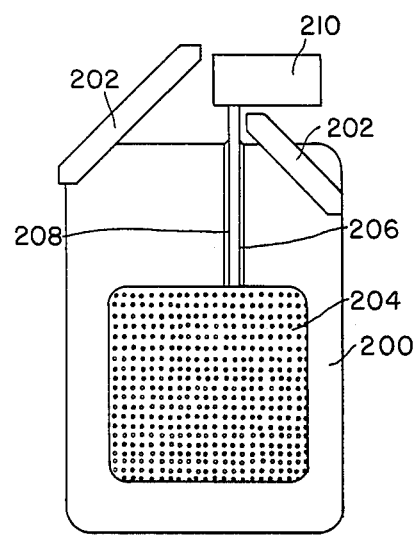
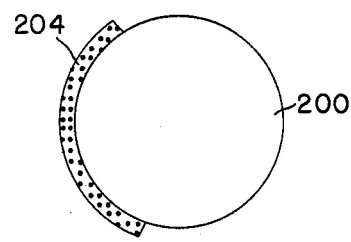
FIG. 13
FIG. 14
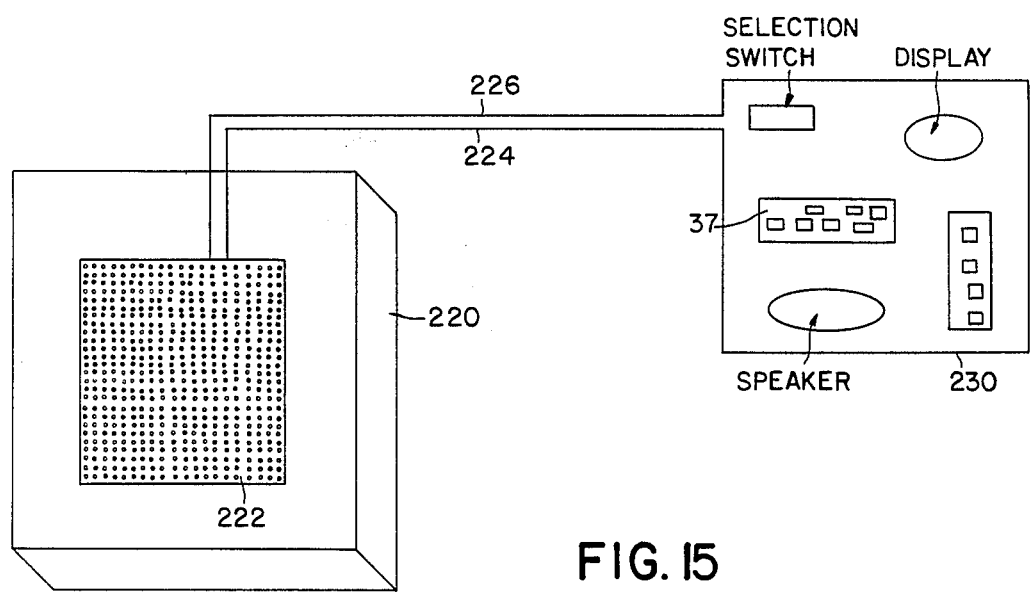
FIG. 15

SPORTS SCORING DEVICE INCLUDING A FLEXIBLE PREZOELECTRIC LAYER RESILIENT LAYER

DESCRIPTION

TECHNICAL FIELD

This invention relates generally to the field of evaluating performance in physical contests involving body maneuvering, and more specifically to scoring in matches between practitioners of the martial arts.

BACKGROUND ART

Martial arts such as karate, kung-fu, tae-kwon do, kick-boxing, boxing, and others, enjoy increasing popularity as physical sports and mental disciplines. Many of these martial arts are the present day successors to ancient forms of hand to hand combat practiced in various regions of the Orient.

Today, the competitive aspects of these martial arts are generally practiced by fighters in a ring (with or without ropes on the perimeter) similar to the type used in boxing.

These martial arts employ, in both their training regime and competition matches, full-contact contest formats, or non-contact or light contact (controlled) sparring sessions, with opponents of approximately equal experience and weight. This training must be done on a regular basis to be effective in developing the requisite skills to defend oneself in a self-defense situation or to perform optimally in an organized competition.

In the non-contact or light contact modes of sparring practice, martial arts such as karate, kung-fu, etc., differ from professional boxing. In practice of these martial arts, offensive "techniques", i.e. attack moves, are executed, or "delivered" toward an opponent's body with full power and speed. They are, however, ideally controlled, "pulled" or stopped just short of actual physical contact, or upon only light contact, depending on applicable rules of the competition. This restraint is not only employed because of the great potential for serious injury that can result from a skillfully delivered unrestrained martial arts technique, but also because this precise control demonstrates mental discipline and physical prowess on the part of the combatant.

A point may be awarded to a fighter when he or she delivers an unblocked attack or technique to the neighborhood of a designated legal target or "vital" area of the opponent's body, with sufficient speed, power and form to be adjudged to potentially cause damage to the opponent's body if not controlled. Vital areas include the kidneys, solar plexus, face, groin, etc. An added requirement is that a point will be awarded only when a technique threatens a designated vital or target area with impact by a predetermined "designated hitting surface" of the attacking fighter's body. Designated hitting surface areas include for example the first two knuckles of a closed fist, the side of the hand, and the ball of the foot.

Excessive contact in delivering a technique in non-contact or light contact matches can cause a fighter to be disqualified, or be denied points, for that technique.

A problem created by non-contact or light contact sports, such as these controlled martial arts sparring exercises, is that accurate scoring is predicated on the subjective evaluation of an exchange of techniques between the fighters, either by the fighters themselves, or by as many as five experienced judges, strategically positioned in tournament matches at corners of the ring and within the ring itself. Dependence on this subjective judgment sometimes results in improperly awarded points, missed points, excessive contact (by a participant attempting to forcefully "record" his point unmistakably for the judges) and in second punching by the defending fighter because he ignored, by design or accident, his opponent's scoring technique.

Martial arts fighters can maneuver their bodies and deliver attacks or techniques toward their opponents with extreme speed in flurries of action. The degree of this speed amplifies the difficulty in determining when points are scored. Even where several officials are employed to judge a match, visual identification of scoring maneuvers is difficult. Disagreement between officials often occurs, due to inequality of perspective enjoyed by the various officials. Moreover, visual acuity may vary among officials, and even, over time, in the same official.

Participants in the sports of Professional Boxing, Professional Karate and Kickboxing, etc. deliver their techniques with full power and speed in competitive matches with the goal of rendering their opponent temporarily incapacitated. A scoring system based on the visible accumulation of damaging blows represents one mode of measuring the effectiveness of a fighter's technique. The rigorous nature of such contests limits participation and offers potential for injury to the combatants. Full contact matches that end without a knockout or TKO are subject to subjective scoring as are the non-contact and light contact matches.

Martial arts practitioners in increasing numbers wear protective garments including padding that covers the fighters' designated hitting areas, such as the hands and feet. Such protective garb is very popular as a means of preventing injuries due to accidental contact. Their use is mandated in the great majority of tournaments in the United States and Canada.

An interesting, but crude, proposal has been made in the hope of improving scoring accuracy in martial arts matches. According to this proposal, each fighter wears a vest-like garment having numerous pockets, each pocket being positioned over a vital area of the fighter's body. Inflatable components, resembling balloons, are placed in the pockets. When the opposing fighter delivers a technique to the neighborhood of a vital area, the corresponding balloon is struck and is said to burst, indicating that the technique was in fact delivered to the neighborhood of the associated vital area.

A significant problem with this proposal is that, once a balloon bursts, it can indicate no further results of action. With this proposal, the fight must be stopped after each point and a new balloon inserted into the appropriate pocket. Such a limitation renders impractical the proposed system.

Another disadvantage of the proposed system is that, while it can indicate when a vital area is contacted, it cannot distinguish between hits utilizing designated hitting areas and hits made with non-scoring other parts of the attacking fighter's body.

Further disadvantages in the proposed system are that the actual force of each blow is not quantitatively measured and no provision is made for participants who prefer sparring without the requirement of receiving or delivering contacting blows.

A general object of this invention is the provision of a system and method for assisting in scoring of physical contests, the system being capable of automatically and discriminately providing positive, instantaneous and repeatable indications of only correctly delivered techniques, wherein a designated hitting area of one fighter's body threatens a vital area of the opponent, without need for actual contact between the fighters. Another object is the provision of a method for accurate, repeatable, quantitative measurement of the actual force of a blow that a fighter receives to his legal target area. Similar objects are envisioned in training implements generally to indicate the force generated by the execution of techniques on or by use of the implement during practice.

DISCLOSURE OF INVENTION

The disadvantages of the prior art are reduced or eliminated, in one embodiment of the invention, by a system for assisting in scoring in a physical contest involving bodily contact between two contestants, wherein the occurrence of bodily contact affects scoring. "Bodily contact" includes both striking by a part of another contestant's body and striking with an implement. The system includes an electromechanical transducer detector and means for mounting at least a portion of the detector proximate the body of a first contestant. The detector is coupled to means for producing an indication in response to application of force to the detector.

Such a system thus incorporates a transducer for translating physical force applied to the region of the transducer to electrical signals, which are used to provide a repeatable and accurate reflection of the delivery of blows by one contestant to the body region of another.

In a more specific embodiment, the tranducer produces a signal having a value which is a function of the amount of force applied in delivery of the blow. Such a system enables the objective evaluation of the force, and efficacy, of the applied blow.

In another specific aspect, the transducer is mounted on or incorporated into a garment to be worn by one of the contestants. The transducer can thus be fixed to be positioned proximate only a, "vital", or valid scoring target area of the wearer contestant's body. Accordingly, the transducer will react to blows impinging in the region of the target area, and will not react to blows delivered to other, non-scoring areas of the contestant's body.

According to another specific feature, the garment to which the detector is affixed comprises a vest at least partially made of protective foam padding. In this manner, the scoring detector system can be incorporated into a garment which provides effective protection and insulation from blows which might otherwise harm a contestant.

In accordance with a further specific feature, the detector comprises a portion of piezoelectric film. When the piezoelectric film is struck, as with a blow delivered toward the wearer contestant's body, the film produces an electrical voltage signal between the sandwiching conductive layers, which can be detected and utilized to provide a tangible indication of the occurrence and/or the force of the blow.

In accordance with a further specific embodiment, the system includes a radio transmitter electrically coupled to the detector, also mounted proximate the body of the wearer contestant, in combination with a radio receiver for detecting blow-indicating transmission from the transmitter at a relatively remote location, such as at a scorer's table or the like.

The receiver is optimally coupled to display and/or recording apparatus for providing tangible audible or visual indications and/or recordings of the occurrence and force characteristics of blows delivered to the contestant wearing the detector.

The principles of the scoring detection unit can also be incorporated in practice apparatus for use in martial arts training by a single participant executing training maneuvers. Such an apparatus for training includes an object suitable for absorbing blows, and an electromechanical transducer mounted in or on the object to receive and respond to impact from such a blow. Means is coupled to the transducer for indicating the occurrence and/or force of the blow to the region of the striking object proximate the transducer.

By use of such an apparatus, a person training for physical competition can effectively evaluate, or have evaluated, the force of blows he delivers to the striking object, and thereby monitor his or her progress in learning to deliver to the object blows of greater force and accuracy.

In specific embodiments, the striking object can include a light or heavy punching bag, a so-called "hitting pad" mounted on a wall or other stationary fixture, for striking by a martial arts or other sports participant during training, or other sports training device, such as a football blocking dummy or sled.

In accordance with a more specific embodiment of both the contact sensing contestant-worn detector, and of the training apparatus described above, means is provided for distinguishing among blows of different characteristics. In accordance with this specific embodiment, a differentiator is coupled in series between the electromechanical transducer and the transmitter. Thus equipped, the system responds preferentially to sharp blows causing the generation of fast rising electrical signals. A peak detector can optionally be provided, such that the system will react to only signals having amplitude above a predetermined minimum. This embodiment thus discards blows which are glancing, scratching or brushing in nature, and which are generally characterized by relatively low amplitude and sometimes by low frequency in the electrical signals generated by the transducer in response to such blows.

In another embodiment, a system incorporates means for detecting proximity of a blow delivered toward a region of a body, without the need for actual physical contact taking place. Such a system includes a proximity sensing system comprising a first component and a second component cooperable with the first component to indicate proximity of location of said components, the indication being achieved at least in part by the use of field energy, and independent of actual physical contact between the components. The system also includes means for mounting the first component proximate a portion of the body of a first contestant, and means for mounting the second component proximate a portion of the body of a second contestant. The system further includes means responsive to the proximity sensing system to produce an indication when the two components are brought to within a predetermined distance of one another.

Such a system is particularly useful in martial arts and other competitive activities conducted in accordance with a noncontact format.

A more specific aspect of such a proximity sensing system includes a detector circuit and means for mounting at least a portion of the detector circuit in close proximity to the body of one contestant. An element for altering an operating parameter of the detector circuit, in response to the location of the element proximate a portion of the detector circuit, is also provided, along with apparatus for mounting the element in close proximity to a portion of another contestant's body. Finally, the system includes means responsive to the alteration of the detector circuit operating parameter to produce an indication in response to the location of the element proximate the contestant-mounted portion of the detector circuit In a more specific embodiment, the detector circuit portion sensitive to proximity of the element is mounted over a target or "vital" area of the wearer-contestant's body. Conversely, the element to which the detector circuit portion responds is mounted proximate a "designated hitting surface" of the other contestant's body. In this way, the system produces an indication output only when (1) a blow is delivered toward and near a vital area of one contestant's body, and (2) the blow is in fact delivered toward that contestant's body by the use of a designated hitting surface of the attacking contestant's body.

More specifically, the detector circuit includes an induction coil driven at a predetermined steady state frequency by an electric A.C. power supply and the element, worn on the opposing fighter's designated hitting area, comprises a portion of electrically conductive material. Means is coupled to the inductor coil circuit to sense variation of frequency or phase in the inductor circuit. Extension of the conductive element to a region proximate the inductor coil changes the impedance of the circuit and thus of the frequency at which this circuit is driven. This difference is detected, and employed, as in a radio transmitter and receiver arrangement, to provide a remote tangible indication, and/or recordation, of a noncontacting technique delivered proximate a fighter's vital target area.

In still another embodiment, the force sensitive system described earlier, and the proximity sensing system, which is independent of actual contact, can be advantageously combined. In such an embodiment, both an electromechanical transducer and an induction coil circuit are mounted proximate a vital area of one contestant. The other contestant bears a conductive element proximate a designated hitting surface of his or her body. The response of the induction circuit/conductive element combination, which responds only to "hits" made with designated hitting surfaces, is used, not independently, but to gate the output of the electromechanical transducer signal. Gating circuitry is provided, coupled between the induction coil circuit and the electromechanical transducer, which inhibits transmission of any output from the transducer, in the absence of an output from the inductor circuit detector. Thus, the force sensing and quantification capabilities of the electromechanical transducer embodiment can be combined with the capacity of the induction circuit embodiment in discriminating between blows delivered by designated hitting surfaces and other blows to provide an output only when the proper hitting surface is used to deliver a contacting blow.

These and other features of the present invention will become apparent from study of the following specific description, and of the drawings, in which:

BRIEF DESCRIPTION OF DRAWINGS

FIG. 6A and 6B are block diagrams illustrating details of electrical circuitry incorporated in the embodiment of the invention illustrated in FIGS. 1-3;

FIGS. 13-15 illustrate details of another application of the embodiment of the invention shown in FIG. 1-3.

BEST MODE FOR CARRYING OUT THE INVENTION

CONTACT SCORING EMBODIMENT

Figure 1:
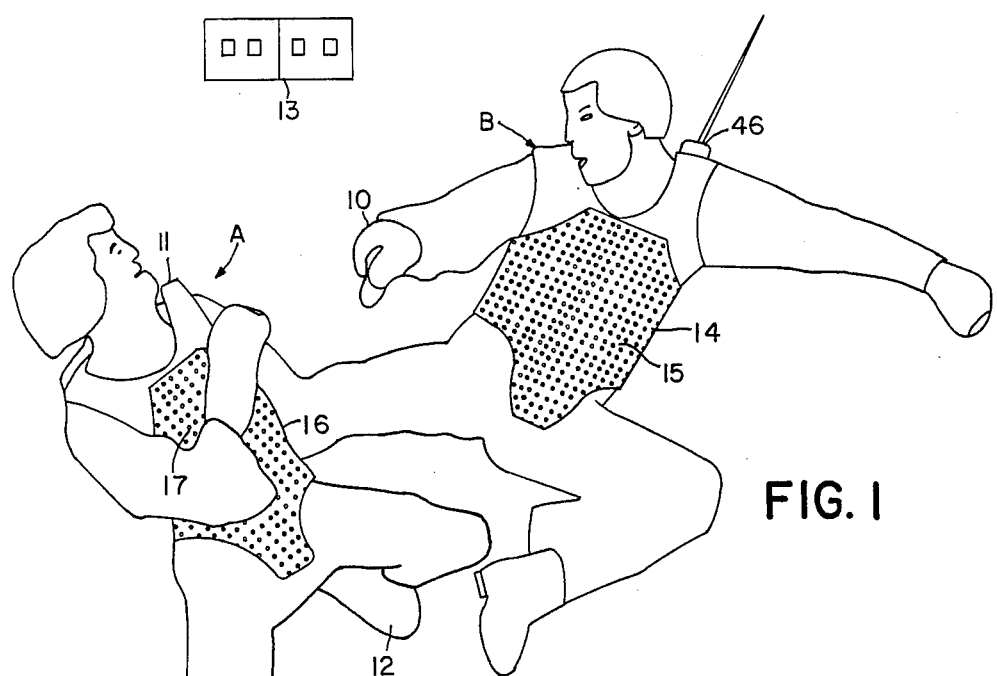
FIG. 1 is a pictorial view illustrating a pair of martial arts contestants utilizing an embodiment of the present invention.

FIG. 1 illustrates two contestants A and B engaged in the practice of the martial arts. The contestants A and B are shown maneuvering to deliver martial arts techniques towards each others' bodies by the use of their hands and feet. The hands may be covered by protective gloves, such as 10, and the feet by protective footwear such as illustrated at 12.

Each contestant also wears another garment, i.e., a vest, such as shown at 14 being worn by contestant B and by reference character 16 as being worn by contestant A. The vests 14, 16 incorporate an embodiment of the present invention, which will be described in more detail below.

Figure 2:
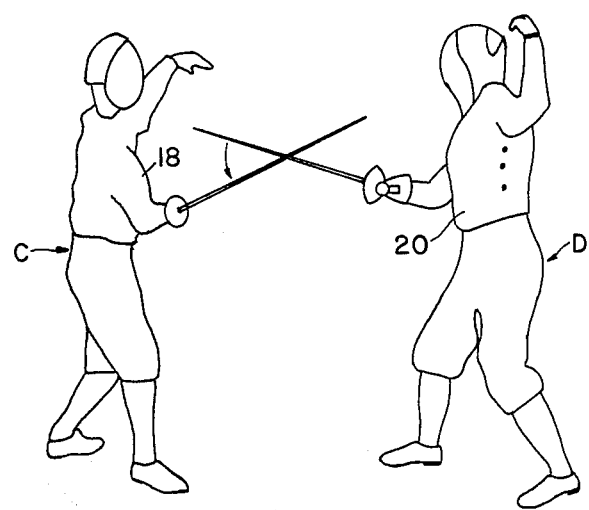
FIG. 2 is a pictorial illustration of a pair of fencers utilizing the embodiment of the invention illustrated in FIG. 1.

FIG. 2 illustrates two other contestants C and D, engaged in the practice of the martial art of fencing. Each of the contestants C and D wears a vest such as illustrated at 18, 20 similar to the vests 14, 16 illustrated in FIG. 1. The use of the present invention can be extended to virtually all contact sports, such as football, and to many non-contact sports as well, in connection with the proximity sensing embodiment discussed below.

The shaded portions 15, 17 of the vests 14, 16 define force-sensitive active sensing areas and contain components for sensing the force of blows delivered to and contacting those areas of the vests.

Figure 3:
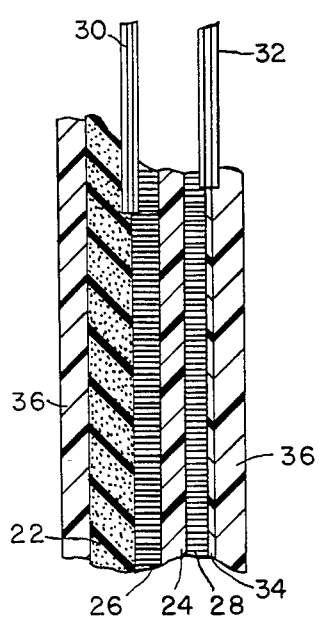
FIG. 3 is a detailed cross sectional view illustrating a portion of the embodiment of the invention shown in FIG. 1.

FIG. 3 is a cross sectional view of part of the shaded portion of one of the vests 14, 16. The portion of the vest illustrated in FIG. 3 is of a laminate construction.

Referring to FIG. 3, there is illustrated a layer 22 of protective padding material. The padding material 22 comprises an approximately 1 inch thick layer of relatively dense closed cell foam, of the well-known variety sold under the trademark ENSOLITE.

Also illustrated in FIG. 3 is a layer 24 of piezoelectric film, polyvinylidene fluoride (PVDF), sandwiched between thin metallized layers 26, 28 of electrically conductive metal. The combination of the piezoelectric film layer 24, combined with the two opposed layers 26, 28 of conductive metal are available for purchase as an integral manufactured pliable sheet product known by the trademark KYNAR, manufactured by Pennwalt Corporation, 900 First Avenue, King of Prussia, Pennsylvania 19406, USA.

In the particular embodiment described here, the peizoelectric film is approximately 28 microns in thickness. The metallic layers 26, 28 comprise layers of silver approximately 0.1 microns in thickness. Nickel and aluminum are also satifactory metallic elements for comprising the layers 26, 28.

Each of the metallic layers 26, 28 is coupled to connecting circuitry by way of respective conductive connection strips 30, 32, which may be made of any suitable conductive metal, such as silver or copper.

The padding material layer 22 is bonded to the metallic layer 26 by means of a suitable nonconductive adhesive material.

The conductive strips 30, 32 are bonded to the respective metallic layers 26, 28 by means of a suitable conducting adhesive interposed between the respective strips and metallic layers.

Optionally, the metallic layer 28 is bonded with nonconductive adhesive to a layer 34 of a strong, pliable plastic material well known and sold under the trademark MYLAR, having a thickness of approximately 0.005 inches. The layer 34 serves to provide physical strength and integrity to the outer facing surface of the assembly described in connection with FIG. 3.

Additionally, an outer protective and decorative coat of vinyl, such as at 36, can be provided on both sides of the vest by means of dipping or spraying.

As illustrated in the FIG. 3 cross section, the protective layer 22 is worn immediately adjacent the body of the contestant wearing the vest of which FIG. 3 is a cross sectional illustration. Thus, metallic layer 26 is toward the inside, relative to the piezoelectric layer 24, and layer 28 faces toward the outer portion, away from the wearer's body.

When the assembly of components illustrated in FIG. 3 in cross section is incorporated into the shaded active sensing areas 15, 17 of the vests 14, 16, and the vests are worn by a contestant as described above, contacting blows impinging, from the right as shown in FIG. 3, produce an easily detectable electrical signals at the conductive strips 30, 32. The piezoeletric film comprises an electromechanical transducer which responds to mechanical force to produce a voltage between its opposite sides. This voltage is conducted by the metallic layers 26, 28 to the respective conducting strips 30, 32, from which they are transferred to other detection and indicating circuitry which will be described in more detail below.

Tests have shown that, in typical martial arts and other sports practice situations, blows impinging on one human competitor and administered by another, or by an instrument, produce signals at the conductive strips 30, 32 which are of sufficient magnitude to render them easily detectable with relatively simple detection circuitry.

In addition to providing a force sensing or contact sensing function, the structure illustrated in cross section in FIG. 3 also provides a physical protective effect, by virtue of the padding layer 22. Thus, the force sensing scoring system is integrated with the protective garment normally worn by a martial arts contestant, or fighter.

Figure 4:
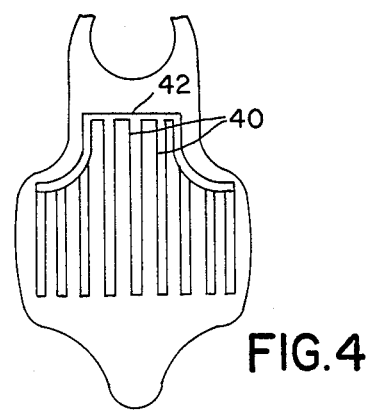
FIGS. 4 and 5 are pictorial illustrations of a variant of the embodiment of FIGS. 1-3.

In one embodiment, the entire shaded active sensing areas of the vests as shown in FIG. 1 have incorporated therein a single integral sheet of the KYNAR piezoelectric material, which covers the whole active sensing area. Alternately, however, as shown in FIG. 4, one can utilize, instead of the single sheet covering the entire expanse of active sensing area, strips 40 of KYNAR material coupled together electrically by the use of copper tape 42 or by patterned electrode metallizations, for good signal generation and economy.

Figure 5:
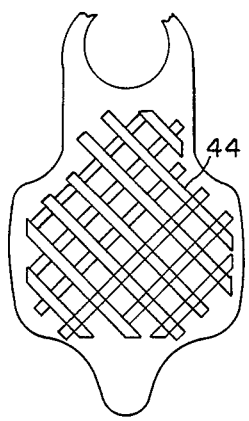

In another embodiment, the sheets can be arranged in a criss-cross matrix pattern, as shown in FIG. 5 at reference character 44. These other embodiments incorporating strips of piezoelectric material can be used to achieve a broad active sensing area without the need for purchase of sufficient amounts of piezoelectric material to actually cover the entire active sensing area, thus reducing cost.

The system of this invention has the capability of registering not only the fact of the delivery of a blow to a contestant's vest active sensing area, but also registering the amount of force generated by administration of the impinging blow due to the piezoelectric material's characteristic of producing electric signals whose amplitude is a function of the force of a blow.

Various types of display and recordation apparatus can be incorporated into, or used in conjunction with, the receiver. For example, a light emitting diode (LED) bar can be used as a display, as can ordinary meters. Alternately, or in addition, a voltage controlled oscillator (VCO) whose generated frequency varies with the amount of voltage input thereto, can be coupled to a speaker and used to emit audible sound in response to the impingement of blows by one contestant upon another. The frequency of the emitted sound, as governed by the voltage controlled oscillator, rises as a function of the amount of force applied in the delivery of a particular blow to which the receiver responds. A means of recording a series of blows comprises a strip chart recorder coupled to or integrated in the receiver in order to produce a lasting representation of the occurrence and force of applied blows plotted against time.

Alternately, the radio transmitter/receiver arrangement can be omitted, and signals from a sensing vest can be transmitted to a monitoring location by conventional conductive leads (not shown) coupled to the conductive strips.

A block diagram describing circuitry for detecting, displaying and recording signals from the conductive strips 30, 32, is described in connection with FIG. 6.

Leads 60, 62 are coupled to the conductive strips 30, 32, and carry signals constituting or corresponding to those generated by the piezoelectric transducer component. The signals from the leads 60, 62 are applied to a front end amplifier 64, which can comprise a MOSFET or JFET amplifier in a voltage follower configuration. The input impedance of this voltage follower can be adjusted so that a signal of the proper voltage level is coupled to the next stage. Its offset voltage is also adjustable to obtain preferably a zero offset voltage. The front end amplifier 64 is designed to match the transducer signals·and circuitry to the downstream detection circuitry, and can be readily selected from well known circuitry. This matching capability is desirable because the output from the piezoelectric transducer can vary with conditions of use, such as size and strength of fighters, area of the force applied by a blow, and other factors.

The next stage is an analog transmission gate 66. This stage is optional and is only used when a non-contact sensing mode is used simultaneously with the contact sensing mode, as described in a later section.

The gate 66 is responsive to a gating signal appearing on a lead 68. In an instance of a first signal level at the lead 68, the gate 66 transmits the signals from the component 64 to a lead 70. In the instance of a second condition on the gating signal 68, the gate 66 blocks such signals. The use of the analog transmission gate 66 will be discussed in more detail below. For the moment, one should assume that the transmission gate 66 remains continuously in its transmissive condition, passing signals from the front end amplifier 64 to the next stage which is a peak detector 67. The peak dectector is basically a rectifying circuit that detects the peak voltage of the incoming signal in response to the strength of the blow delivered to the piezoelectric transducer. The voltage output of the peak detector is able to hold in known fashion for a short time to allow the display of the peak value in later stages. The holding time can be adjusted by the time constant of a capacitor and resistor network in the peak detector at the output end. The peak detector 67 is connected to a driver amplifier 68a which provides sufficient power to drive the output channels. Instead of connecting the analog transmission gate 66 directly to the peak detector 67, it is optional to add a differentiator 71 that mainly consists of a capacitor and resistor such that the signal is taken from across the resistor as shown in FIG. 6. The differentiator allows the measurement of the time derivative of the signal and thus is indicative of the speed of the blow applied.

The lead 70 divides into several parallel channels. In a first channel, the transmitted signal is directed to a voltage comparator 72. The output of the voltage comparator is a function of the difference between the signal applied at the lead 70 and another predetermined threshold value. Only signals exceeding the threshold values are passed on, the others being discarded. The signal from the comparator 72 is directed to an LED driver circuit 74. The LED driver circuit 74 drives an LED bar display 76. In such a display, the length of a displayed bar corresponds as a function of the magnitude of the signal appearing at the lead 70, which in turn indicates the force of an applied blow.

Another channel includes an A-to-D converter 77 and an LED driver circuit 78 which is coupled to drive an LED seven-segment display 79. This channel involves the use of a sequence of separate light emitting diodes, the number of diodes being lighted corresponding to the force of an applied blow.

Another channel from the lead 70 is directed to a voltage controlled oscillator (VCO) 82, and subsequently to a power amplifier 84 and speaker 86. The VCO 82 responds to produce an output having a frequency which is a function of the magnitude of the signal at the lead 70. The output of the VCO 82 is amplified by the amplifier 84, and its output applied, in turn, to the speaker 86. The speaker 86 produces an audible signal whose frequency is an increasing function of the signal at the lead 70, and is an increasing function of the force delivered by a contacting blow.

Another output of the lead 70 follows a channel to a recorder apparatus 88. The recorder apparatus 88 is a device for making a permanent record, against time, of the signal appearing at the lead 70. In a preferred embodiment, the recorder 88 constitutes a strip chart recorder of known design and construction.

Another channel of the output at the lead 70 is directed to a radio frequency (RF) transmitter 89. The RF transmitter 89 produces radio frequency signals (either amplitude modulated or frequency modulated) which correspond to and represent the magnitude of the signal appearing at the lead 70. The radio frequency transmitter 89 is a miniature transistorized transmitter which is sufficiently small and light to be mounted on a portion of the vest 14, 16, as shown in FIG. 1, on the upper part of the vest near the rear of the shoulder.

Another channel of the output at the lead 70 is directed to an oscilloscope 90 which can be used to analyze the waveform of the output signal at the lead 70. The oscilloscope can also be connected immediately after the analog transmission gate 66 to evaluate the overall waveform of the signal.

The electronic components in the above recited system are well known in the art and can be selected by a person of ordinary skill in the art and from commercially available sources.

Figure 7:
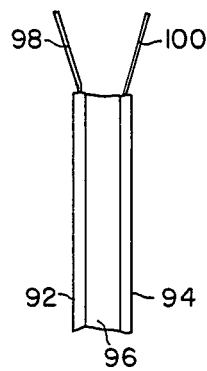
FIGS. 7 and 8 are schematic drawings illustrating a portion of the circuitry shown in block form in FIG. 6.
Figure 8:
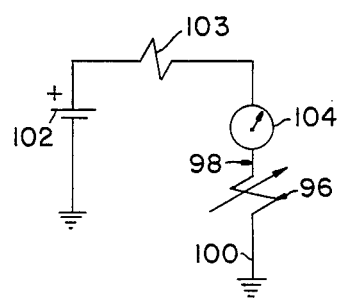

FIGS. 7 and 8 illustrate another embodiment of the invention utilizing, instead of the piezoelectric film material, a material having variable resistance characteristics. Such a variable resistance material can comprise a graphite-impregnated foam, or a rubberized material of known type which also exhibits variable resistance characteristics upon mechanical compression.

FIG. 7 illustrates a cross-sectional view of a vest, such as 14, 16, in which such a variable resistance material is employed. The vest, seen in cross-section, includes protective foam layers 92, 94, between which is sandwiched a layer 96 of the variable resistance material. The opposite sides of the variable resistance material are coated with a thin metallic layer (not shown in FIG. 7) but which is similar to the metallic layers which coat the piezoelectric material described in connection with FIG. 3 above. Electrical leads 98, 100, are coupled respectively to these opposing metallic layers.

FIG. 8 shows an example of a simple series circuit which can be employed to sense the occurrence and/or force of blows directed against the portion of the vest material shown in FIG. 7. An electical source 102 provides a voltage which extends, by way of a resistor 103 and leads 98, 100, across the variable resistance material 96 of the vest. A current registering device 104 is coupled in series with the leads 98, 100. When a contestant wearing the vest having structure such as shown in FIG. 7 is struck with a blow, the variable resistance layer 96 is compressed, and the resistance between the leads 98, 100 is substantially reduced. This causes an increase in the current flowing through the circuit as shown in FIG. 8, and an increase in the reading shown on the ammeter 104. The output of the ammeter 104 can be employed in a manner analogous to that described above in connection with FIG. 6 to provide an output indicating the occurrence and/or force of a blow, which may easily be monitored by match officials.

NON-CONTACT SCORING EMBODIMENT

Figure 9:
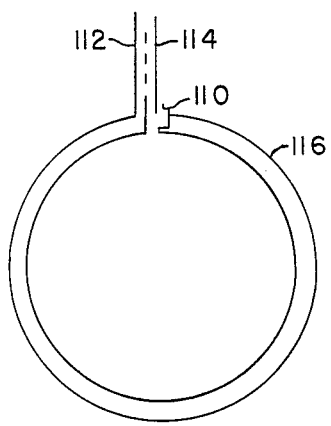
FIGS. 9-11 are detailed drawings illustrating a portion of another embodiment of the present invention.

Another embodiment of the present invention provides apparatus and circuitry for sensing the close approach of a fighter's designated hitting surface to a vital, or legal target area of his opponent, and for providing an indication of such proximity independently of the need for actual contact. FIG. 9 shows a portion of the components of such an embodiment. This noncontact system includes a tuning coil 110. The coil 110 terminates in a pair of leads 112, 114, which are connected to active circuitry in a manner described in more detail below. The coil 110 is wrapped around a coil 116.

As will be described in more detail below, the coil 110 is inductively coupled with the coil 116.

The coils are embedded in a portion of the foam padding of one of the vests such as 14, 16. Each fighter wears gloves and/or footwear, each of these garments bearing a portion of conductive material, such as metallic foil, which is permanently or removably fixed to the garment approximately over designated hitting surface of the fighter's hands and/or feet.

When a fighter extends a designated hitting area, thus equipped, toward the general region of the coil 116, the conductive foil alters the impedance of the circuit including the arrangment of the coils 110, 116, and creates a disturbance, or phase shift, in the current flowing in the coil 110 and the leads 112, 114. This disturbance is detected and converted to a signal indicating that a near hit has been accomplished with one fighter's designated hitting surface proximate, but not necessarily contacting, the other fighter's vital, or target area.

Figure 10:
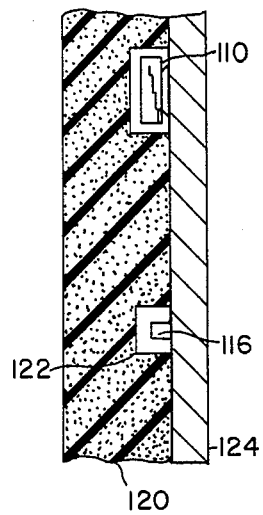

FIG. 10 illustrates the manner in which the coil arrangement of FIG. 9 is incorporated into a protective vest, such as 14, 16. FIG. 10 illustrates a portion 120 of the foam padding layer comprising one of the vests 14, 16, a portion which is positioned generally proximate one of the wearer fighter's vital or legal target areas of his body. The foam padding portion 120 defines therein a generally circular groove 122, shown in cross-section in FIG. 10. Embedded within the groove 122 are the coils 116, 110. The coil 110 is positioned such that its associated leads 112, 114 (not shown in FIG. 10) run through another groove in the vest padding material to a location near the shoulder or back of the vest, at which a miniature A.C. voltage source is located.

Covering the groove 122 with its associated coils 110, 116 is a layer of protective material 124, which may be a suitable type of resilient material to protect the coils 116, 110 from damage in the event of being struck by a fighter's blow.

In a manner similar to the construction of the vest laminate as shown in FIG. 3, the vest of FIG. 10 may optionally have applied to it a layer of colored material both decorative and protective, such as an accumulation of vinyl achieved by dipping.

Figure 11:
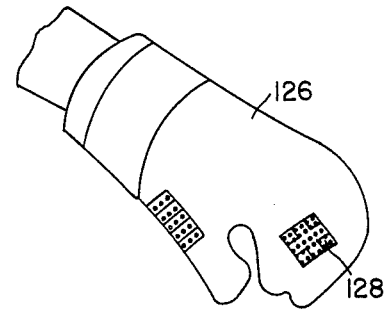

FIG. 11 illustrates a protective garment worn by a fighter, i.e., in this instance a protective glove 126 which bears on its surface a portion 128 of conductive metallic foil. When the glove 126 with its foil portion 128 is extended toward a region of a fighter's body proximate a coil such as 116, the above noted disturbance in the circuit operating parameter is detected and made manifest in a tangible way, indicating a nearhit.

The portion 128 can be either permanently or removably attached to the glove; removable attachment can be effected by use of a material known by the trademark VELCRO.

The conductive portion 128 can be either a ferrous or a non-ferrous material. The detection circuitry (described below in connection with FIG. 12) can be tuned to respond exclusively to the approach of either the ferrous or non-ferrous material. The detector circuit of the fighter wearing the ferrous material is tuned to respond to only non-ferrous material, and vice versa, to avoid a fighter actuating his own detector.

Figure 12:
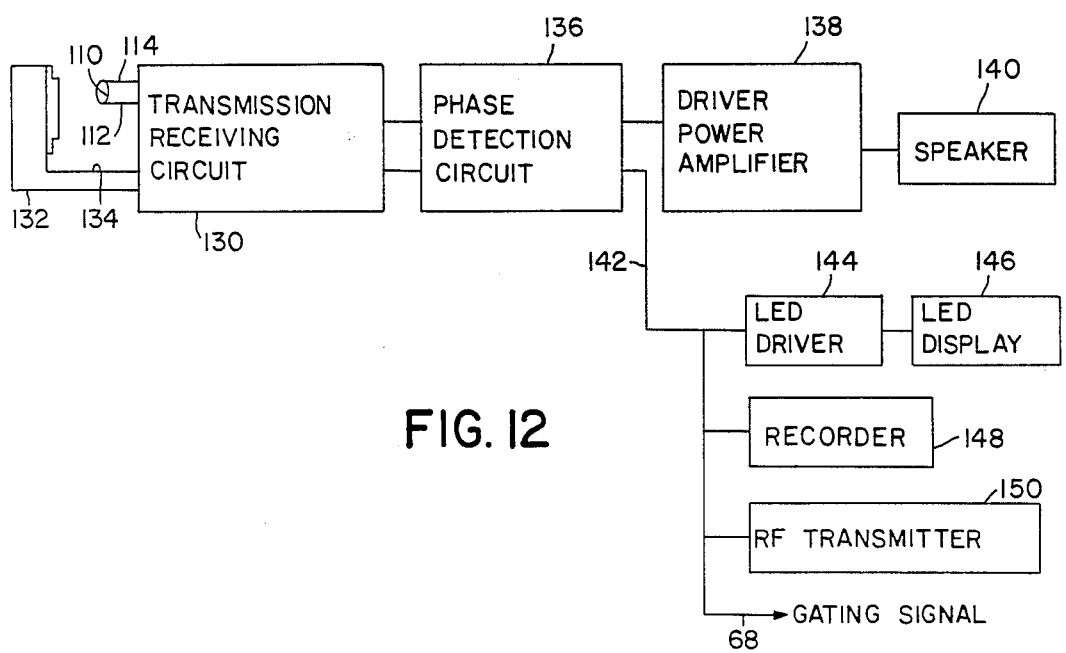
FIG. 12 is a block diagram illustrating a portion of circuitry utilized in connection with the embodiment of the invention illustrated in FIGS. 9-11.

FIG. 12 is a block diagram of the circuitry operatively associated with the noncontact sensing embodiment incorporating the coils 110, 116. The receiving portion of the transmission/receiving circuit 130 is inductively coupled to the coil 116 by way of leads 132, 134.

Disturbances in the fields in the neighborhood of the coil 116, which fields are initially induced by energization of the coil 110, are detected over the leads 132, 134 by a phase detector circuit 136 which receives the output from the leads 132, 134 after processing by the transmission/receiving circuit. The A.C. output from the phase detection circuit 136 is transmitted to a power amplifier 138. The power amplifier 138 produces, in response to an output from the phase detector circuit, a signal of sufficient magnitude to drive a loud speaker 140. Speaker 140, in response thereto, produces an audible signal which indicates to match officials that a near-hit has occurred in the vicinity of one fighter's vital area, delivered by a designated hitting surface of the other fighter's body.

The coils 110, 116, the transmission-receiving circuit, the phase detection circuit, the audio amplifier and speaker, are embodied in the corresponding portions of a catalog number H63-3002 metal detector identified by the trademark "Micronta", and manufactured and sold by Radio Shack, a division of Tandy Company, Fort Worth, Texas, USA, and published in the associated "Owner's Manual", hereby expressly incorporated by reference.

Other indicator channels are coupled to receive the output from the phase detection circuit over a lead 142. One such channel includes an LED driver circuit 144, which is coupled to an LED display 146, and which operates in a manner analogous to that referred to in connection with the contact indicating embodiment of this invention, described in connection with FIG. 6A.

Another channel which receives the output of the lead 142 comprises a recorder device 148, which is preferably a strip chart recorder for indicating a graph against time of the occurrence of near hits.

Another channel is directed to an RF transmitter 150 which operates analogously with the transmitter described above, and is associated with a radio receiver operating in a manner analogous to that described in connection with the contact sensing embodiment.

Another channel of the output appearing at the lead 142 comprises the lead 68 which was referred to in the previous discussion concerning FIG. 6A as bearing a gating signal for operating the analog transmission gate 66 shown in FIG. 6A and 6B. The analog transmission gate 66 and the gating signal delivered thereto over the lead 68, coupling the circuitry of FIG. 6A to that of FIG. 12, underlie an explanation of a manner of simultaneously using both the contact and noncontact embodiments in one vest, operating cooperatively.

In such an embodiment, the piezoelectric film laminate is provided in the vest as in the description of FIG. 3. Additionally, however, at least one set of coils 110, 116 is also embedded in a groove proximate a vital area of a vest wearer's body in the protective padding of the vest, as described in connection with FIG. 10.

Circuitry such as shown in FIG. 6A is provided in conjunction with the piezoelectric film component.

Circuitry such as shown in FIG. 12 is provided associated with the coils 110, 116.

The lead 68 is coupled between the output of the phase detection circuit 136 shown in FIG. 12 and the input to the analog transmission gate 66 illustrated in FIG. 6A and 6B. When a signal is present on the lead 68, the analog transmission gate is open, i.e., it freely transmits signals between the front end amplifier 64 and the output lead 70. When no signal is present at the lead 68, the analog transmission gate is closed, and does not transmit signals between the high impedance amplifier 64 and the output lead 70.

It can be seen that no signals produced by impacting the piezoelectric film associated with the circuitry of FIG. 6 will result in a signal reaching the output lead 70, unless there is simultaneously present an output from the noncontact embodiment component comprising the coils 110, 116 and the phase detection circuitry 136.

Thus, by incorporating both the noncontact embodiment and the contact embodiment into the same vest, the system can be made to both indicate, measure and evaluate the nature of contact made, discriminate between contacting hits which are made with the designated hitting areas of the other fighter's body, and those which are made with other parts of the attacking fighter's body.

When both the noncontact embodiment and the contact embodiment are employed, simultaneously, as described above, the fighters wear conductive metal foil portions on their protective handwear and footwear, aligned with the designated hitting areas of the hands and feet.

PRACTICE EQUIPMENT EMBODIMENTS

Embodiments of the present invention can be employed in stationary training equipment, as well as in protective garments worn by participants in sports contests. FIG. 13, for example, shows a heavy punching bag 200 suspended from a fixed support by hanging structure 202. The punching bag 200 (shown in top view in FIG. 14) bears a panel 204 which is pressure sensitive, and which embodies the piezoelectric film and electrically conductive layer structure described in FIG. 3 as worn in a competitor's vest.

The panel 204 comprises a portion of piezoelectric film material sandwiched between metallic foil layers, as described in connection with FIG. 3. Leads 206, 208 are connected respectively to the opposite metallic foil layers and are directed to electronic apparatus 210 comprising circuitry and apparatus similar to that described in connection with FIG. 6A. The panel 204 is appropriately covered with a protective material to inhibit damage to the layers constituting the panel 204.

When the panel 204 on the punching bag 200 is struck by a fighter practicing his techniques by the use of the bag, an electrical signal is produced at the lead 206, 208 indicating the occurrence and amount of force of the applied blow. This signal is directed to the electronic apparatus 210 which provides, in a manner analogous to that described above, various indications of the occurrence and the force of the applied blow.

FIG. 15 illustrates another type of training device, sometimes known as a "striking pad", indicated generally at 220. The striking pad comprises a layer of high density closed cell foam, such as the material known by the trademark ENSOLITE. A rectangular panel 222 is attached to one side of the striking pad. The panel 222 includes a portion of piezoelectric film sandwiched between a pair of metallic foil layers similar to that described in connection with FIG. 3. As in the case of the punching bag 200, the panel 222 is covered with a material suitable for inhibiting damage to the panel. Leads 224, 226 are respectively connected to the metallic foil layers.

The striking pad 220 is commonly mounted to a wall or other fixed structure, and a practicing fighter strikes it with hands or feet in order to practice his technique. When the panel 222 is struck, it produces a signal at the leads 224, 226 indicating the occurrence and force of the applied blow. The signals at the leads 224, 226 are directed to electronic apparatus 230, also shown generally in FIG. 15. The electronic apparatus 230 includes various types of apparatus and circuitry for providing tangible indication of the occurrence and force of applied blows, similar to those described in connection with FIG. 6A, and which can easily be selected and implemented.

Practice equipment analogous to that described here can be employed in virtually all contact sport training equipment, such as football blocking dummies and sleds, pads, baseball bats and gloves, targets of various kinds, lacrosse and hockey sticks, and many others.

It should be understood that the embodiment described incorporating piezoelectric film for scoring detection does more than indicate merely gross force applied in the administration of a blow. True, the amplitude of the voltage signal from the transducer is a function of applied force. More information about the blow, however, is indicated by the transducer output voltage signal.

More specifically, the waveform of the transducer output voltage carries information describing the velocity of an incident blow, as well as the duration of contact made by the blow on the recipient. The velocity of the blow is a function of the slope of the leading edge of the waveform produced by the transducer in response to the blow. The greater the slope, the faster the blow is administered.

The duration of the blow is a function of the width of the first positive-going peak of the transducer output signal. The greater the width, the longer the duration.

The output waveform thus defines a "signature" of the administered blow. Testing has shown that a legal scoring blow produces a waveform having a particular signature. For instance, a non-scoring blow delivered by, for instance, an elbow, seldom possesses the velocity of a scoring blow administered wtih a hand or foot.

Additionally, the duration of the first peak signal indicates the degree of penetration of the blow.

The described embodiment can be supplemented by the addition of a device to monitor and retain a representation of the delivered blow. Such device can comprise a strip chart recorder, or a known type of oscilloscope such as 90 in FIG. 6A, having capability of retaining for a time a display of a detected waveform.

A judge or match official viewing such a display can evaluate the quality of the blow it represents. In full contact matches, an optimum blow is indicated by high force (amplitude) and high velocity (slope). A good blow also possesses a characteristic duration dependent on some physical variables, such as the degree of resiliency of the vest material. Duration should be sufficiently long to indicate sufficient penetration, but not so long as to dissipate its force over an excessive period of time.

One method of providing a benchmark signature indicating a standard for a good blow is to have a fighter of known high skill deliver several blows to a transducer under fighting conditions. The official studies the displayed waveforms and can quantify the attributes identified above. Subsequent blows delivered in actual matches are then compared with the standard for evaluation.

Such evaluation can be performed as well with the transducer apparatus used in the practice equipment and contact scoring embodiments.

The various audio and visual indicators described in FIG. 6A, and their power supplies, can optionally be mounted on the fighters' vests and provide a completely portable unit, with no need of remotely located blow indicator elements.

It is to be understood that this description is intended as illustrative, rather than exhaustive, of the invention. Persons of ordinary skill in the relevant art may make certain additions to, deletions from, or changes in the embodiments described in this disclosure without departing from the spirit or the scope of the invention, as set forth in the appended claims.

We claim:

1. A scoring apparatus for indicating at least one characteristics of an externally applied impact by a sports participant to a deformable object, wherein said characteristic is at least one of velocity, force or energy of said impact, said apparatus comprising flexible transducer means, responsive to said impact, for providing an analog output, said transducer means comprises a piezoelectric film layer comprises of a piezoelectric material, wherein said transducer means is attached to a first resilient layer of material, wherein said resilient layer is above or below said piezoelectric film layer such that said impact deforms only a portion of said film layer and only a portion of said first resilient layer; means, responsive to said analog output, for indicating said one characteristic of said impact, wherein said flexible transducer means of said apparatus comprises an active means for generating an electrical output in response to said impact.

2. An apparatus as defined in claim 1, wherein said deformable object is a garment.

3. The apparatus as defined in claim 1, wherein said deformable object is a glove.

4. The apparatus as defined in claim 1, wherein said deformable object is a vest.

5. The apparatus as defined in claim 1, wherein said deformable object is a hitting pad.

6. The apparatus as defined in claim 1, wherein said deformable object is a punching bag.

7. The apparatus as defined in claim 1, wherein said deformable object is a football blocking dummy.

8. The apparatus as defined in claim 1, wherein said piezoelectric film layer comprises a plurality of physically separated, electrically connected piezoelectric members.

9. The apparatus as defined in claim 1, wherein said deformable object further includes at least a second layer of resilient material with said piezoelectric material sandwiched between said first and said second resilient layers.

10. The apparatus as defined in claim 1, wherein said analog output has an initial rate of increase and said indicating means includes means, responsive to said initial rate of increase, for signifying velocity of said impact.

11. The apparatus as defined in claim 1, wherein said analog output comprises an initial rate of increase, a peak amplitude or a duration.

12. The apparatus as defined in claim 1, wherein said deformable object includes a curved surface, said first resilient layer is curved, and said second film layer is contoured to the curved shape of said first resilient layer.

13. The apparatus as defined in claim 1, wherein said indicating means indicates the force of said impact.

* * * * *